United States Patent [19]

Ekkelboom

[11] 4,038,579
[45] July 26, 1977

[54] SOLDER JOINT CONNECTION BETWEEN LEAD-IN CONDUCTOR AND ELECTRODE

[75] Inventor: Tjepke Hendrik Ekkelboom, Eindhoven, Netherlands

[73] Assignee: U.S. Philips Corporation, New York, N.Y.

[21] Appl. No.: 422,587

[22] Filed: Dec. 6, 1973

[30] Foreign Application Priority Data

Jan. 11, 1973 Netherlands ............................ 7300381

[51] Int. Cl.² .............................................. H01J 5/50
[52] U.S. Cl. ....................... 313/331; 313/333; 313/335; 219/145; 148/24
[58] Field of Search ............... 313/331, 332, 335, 337, 313/357, 333; 29/470, 470.6, 484; 219/145, 146; 148/23, 24

[56] References Cited

U.S. PATENT DOCUMENTS

| | | | |
|---|---|---|---|
| 2,329,343 | 9/1943 | English et al. | 313/332 X |
| 2,341,716 | 2/1944 | Herdman | 313/332 X |
| 2,394,984 | 2/1946 | Claussen | 313/332 |
| 2,892,924 | 6/1959 | Wood | 219/145 |
| 2,922,028 | 1/1960 | Butler et al. | 219/145 |
| 3,198,932 | 8/1965 | Weatherly | 219/145 |
| 3,315,116 | 4/1967 | Beese | 313/331 X |
| 3,389,290 | 6/1968 | Yoshida et al. | 313/337 |
| 3,673,454 | 6/1972 | Notelteirs | 313/331 |

Primary Examiner—Saxfield Chatmon, Jr.
Attorney, Agent, or Firm—Frank R. Trifari; Robert S. Smith

[57] ABSTRACT

A soldered joint between articles of at least one of the high melting point metals, high melting point carbides and high melting point metal oxides, which joint contains zirconium in which at least the external surface layer of the soldered joint consists of zirconium nitride.

The soldered joint is preferably used for securing electrodes for high-pressure gas discharge lamps to current supply conductors.

The soldered joint can be obtained by soldering with zirconium in a rare gas atmosphere whereafter the soldering area is heated for some time in a nitrogen-containing atmosphere.

4 Claims, 1 Drawing Figure

U.S. Patent     July 26, 1977     4,038,579
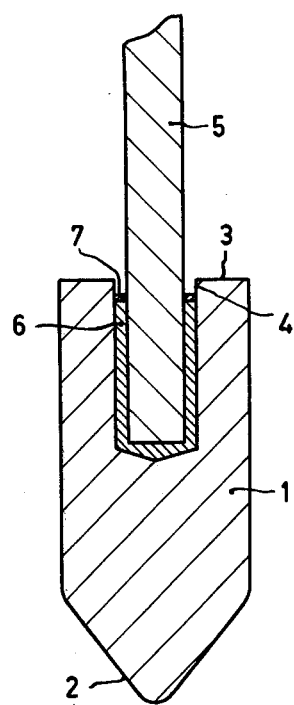

SOLDER JOINT CONNECTION BETWEEN LEAD-IN CONDUCTOR AND ELECTRODE

The invention relates to a soldered joint between articles mainly consisting of at least one of the high melting point metals, high melting point metal carbides and high melting point metal oxides, said joint containing zirconium. Furthermore, the invention relates to an electrode intended for a high-pressure gas discharge lamp and secured to a current supply conductor by means of such a soldered joint, and to a high-pressure gas discharge lamp provided with such an electrode. Furthermore, the invention relates to a method of manufacturing the said soldered joint.

In the following description and claims high melting point metals are understood to mean metals which have a melting point of more than 2400° C. High melting point metal carbides and high melting point metal oxides are understood to mean metal carbides and metal oxides having a melting point of more than 2000° C and showing no noticeable decomposition at the said temperature of 2000° C. Examples of such materials are tungsten, tantalum, molybdenum, rhenium, osmium, irridium, niobium, tantalum carbide, tungsten carbide and aluminium oxide.

It is known that a joint between tungsten articles can be obtained by soldering with zirconium. A quantity of zirconium is provided at the solder area between the articles whereafter the solder area is heated in an inert atmosphere to a temperature of approximately 1700°-1750° C at which temperature melting phenomena occur. These melting phenomena are a result of the formation of a zirconium tungsten alloy which has a melting point below the melting point of zirconium (approximately 1850° C). Such a soldered joint has a satisfactory mechanical strength. It has, however, the drawback that it is not resistant to temperatures approximating the said temperature of 1700°-1750° C. Furthermore it is found that the zirconium solder already evaporates to a considerable extent at temperatures considerably below this temperature.

In many cases it is desirable to have a soldered joint between articles of high melting point material which can be brought to a temperature of, for example, 1400°-1600° C without becoming inadmissibly weak and without leading to a large evaporation of the solder material. Such a joint may be used, for example, very advantageously for securing an electrode intended for a high-pressure gas discharge lamp to a current supply conductor.

To secure a tungsten electrode to a tungsten current supply conductor it is known to use a low-melting point solder, for example, platinum. However, the use of platinum has the drawback that the electrode easily comes loose during operation of the lamp because the soldered joint in the lamp may reach a temperature of, for example, 1400°-1500° C. Furthermore the vapour pressure of platinum is inadmissibly high at these temperatures. It is also known to use a high melting point solder, for example, molybdenum having a favourable vapour pressure for securing the electrode and the current supply conductor. The melting point of molybdenum is, however, very high, (approximately 2600° C) so that a high soldering temperature is required. At such a high soldering temperature a strong recrystallisation of current supply conductor and/or electrode occurs around the solder area so that a weak electrode construction is obtained.

It is an object of the invention to provide a soldered joint between high melting point materials which does not have the above-mentioned drawbacks of the known soldered joints and which can be brought to very high temperatures without any objection.

According to the invention a soldered joint between articles mainly consisting of at least one of the high melting point metals, high melting point metal carbides and high melting point metal oxides, which joint contains zirconium is characterized in that at least the external surface layer of the soldered joint consists of zirconium nitride.

A soldered joint according to the invention has a very great mechanical strength. This strength is also maintained at high temperatures. It has been found that this soldered joint does not come loose, even at temperatures considerably above the melting point of zirconium, (approximately 1850° C). The zirconium nitride layer may be relatively thin. Furthermore, the said zirconium nitride layer has the advantage that it is an excellent protection against the release of zirconium vapour. The vapour pressure of zirconium nitride itself (melting point of approximately 2980° C) is very low.

An important advantage of a soldered joint according to the invention is that it can be obtained at comparatively low temperatures so that the mechanical properties of the articles to be soldered are substantially not detrimentally influenced.

The thickness of the zirconium nitride layer in a soldered joint according to the invention can be chosen within very wide limits. However, zirconium nitride layers whose thickness is at least 1 $\mu$ are preferred. In that case a sufficient strength at comparatively high temperatures and a satisfactory protection of the zirconium metal in the soldered joint is ensured. It is possible for the soldered joint to consist completely of zirconium nitride.

A very advantageous embodiment of the invention is an electrode according to the invention intended for a high-pressure gas discharge lamp, which electrode mainly consists of at least one of the metals tungsten and tantalum and is secured by means of a soldered joint according to the invention to a current supply conductor mainly consisting of at least one of the metals tungsten, molybdenum and tantalum. Tungsten and/or tantalum of the electrode material can be mixed or alloyed with, for example, thorium oxide, rhenium or tantalum carbide. Such an electrode according to the invention can be brought to a high temperature without the drawbacks of loosening or of forming an unwanted metal vapour.

Such an electrode according to the invention is preferred which consists of a mainly cylindrical body having a termination for the discharge which is conical or spherical shaped, while the end face of the electrode remote from the termination is provided with an aperture in which the current supply conductor is secured by means of zirconium solder and in which the external surface layer of the solder is converted into zirconium nitride. Such an electrode construction has the advantage that it has a great mechanical strength. When soldering the current supply conductor to the electrode, temperatures may be used which are below the melting point of zirconium. Recrystallisation and consequently brittleness of electrode and current supply conductor is then substantially prevented.

An electrode according to the invention is preferably used in a short-arc xenon discharge lamp. In such a lamp the electrode construction is thermally and mechanically loaded to a very high extent. The electrode in the lamp may be an anode or a cathode or, in the case of an AC-operated lamp, alternately an anode and cathode.

The soldered joint, particularly the soldered joint of a current supply conductor to an electrode is preferably manufactured by means of a method according to the invention which is characterized in that a quantity of zirconium is provided in the vicinity of the soldering area between the articles consisting mainly of high melting point metal, high melting point metal carbide and/or high melting point metal oxide, the soldering area being brought in a rare gas atmosphere at least to a temperature at which wetting of the soldering area occurs, the soldering area being subsequently heated in a nitrogen-containing atmosphere and being finally cooled.

In a method according to the invention a soldered joint with zirconium is made first. The soldering area is provided with zirconium and is then heated to at least such a temperature that melting phenomena and wetting of the soldering area occur. This soldering temperature will generally be substantially equal to the melting point of zirconium. When soldering tungsten or tungsten-containing articles, wetting of the soldering area at comparatively low temperatures will occur as a result of the formation of a tungsten-zirconium alloy. Soldering with zirconium is to take place in a rare gas atmosphere so as to avoid contamination of the soldering area and premature formation of zirconium nitride at the soldering area. Soldering with zirconium can be performed, for example, by heating the soldering area with a high frequency coil in the rare gas atmosphere until zirconium flows. The relatively low soldering temperature is only to be maintained for a short time. After manufacturing the zirconium joint, which has a grey appearance after cooling, the soldering area is to be heated in a nitrogen-containing atmosphere. It is advantageous to cause the heat treatment in a rare gas without interruption and thus without intermediate cooling to change over to the heat treatment in a nitrogen-containing atmosphere. At the second stage of the heat treatment the zirconium is superficially nitrated. The thickness of the zirconium nitride film then formed is dependent on the temperature and on the nitrogen concentration during nitration and furthermore on the duration of nitration. After cooling, which may be effected for example in air, nitrogen, in an inert or in a reducing atmosphere, the soldered joint having a brown-bronze coloured appearance is ready.

In a method according to the invention argon is preferably used as a rare gas because this gas is cheap and is available in a very pure form.

In a method according to the invention the heat treatment in a nitrogen-containing atmosphere is preferably effected at a temperature of between 1600° and 1900° C for at least 1 second. In fact, the formation of a suitable zirconium nitride layer is then ensured. If nitration is effected at temperatures below 1600° C the time required for the formation of a nitride film having the desired thickness for practical uses is too long; temperatures of more than 1900° C are less suitable because the mechanical properties of the articles to be soldered may then be detrimentally influenced, for example, by re-crystallisation.

In a method according to the invention nitrogen or a mixture of nitrogen and rare gas is preferably chosen as a nitrogen-containing atmosphere, because then the best zirconium nitride layers are obtained. The invention will now be further described with reference to some experiments and a drawing.

The drawing diagrammatically shows the cross-section of an electrode according to the invention which is suitable for a short-arc xenon discharge lamp.

EXPERIMENT 1

Two tungsten rods (diameter 1.6 mm) are soldered together by their ends. For this purpose the rods are provided with a quantity of zirconium at the soldering area and subsequently heated in an argon stream up to a temperature of 1700°–1750° C. Subsequently the rods are maintained at this temperature for approximately 15 seconds in a nitrogen stream and are then cooled. Measurements of the tensile strength (2 tests) yielded the values 100 and 144 kg.

For the purpose of comparison the tensile strength of the joint between two similar tungsten rods was measured. These rods were soldered with zirconium in the same manner as described but the heat treatment in nitrogen was not carried out. The tensile strength was found to be of the same order in this case.

EXPERIMENT 2

The electrode shown in the FIGURE has a cylindrical electrode body 1 of thoriated tungsten (tungsten containing 1.5% by weight of $ThO_2$) having a diameter of 8 mm. The electrode has a conical tip 2 serving as a termination for the discharge. The end 3 of the electrode body is provided with an axially located aperture 4 having a diameter of 3.5 mm. A tungsten current supply conductor 5 having a diameter of 2.5 mm is soldered in the aperture 4. The soldered joint is obtained by introducing approximately 25 mg of zirconium in the aperture 4 and by heating the electrode tip down and provided with the current conductor 5 in a high frequency furnace in an argon stream until wetting with zirconium occurs. Subsequently nitrogen is passed through the furnace at a temperature of approximately 1750° C for 20 seconds. A zirconium nitride film 7 having a mean thickness in the order of 50 $\mu$ is then produced on the zirconium solder 6.

To check the temperature resistance of the electrode construction thus obtained which is suitable for a short-arc xenon discharge lamp the construction was vertically expanded by its current supply conductor with the electrode body pointing downwards in a furnace and was subsequently heated under argon. Only at a temperature of approximately 2100° C the electrode body was found to come away from the current supply conductor.

In a manner completely analogous as described for the above-mentioned experiments relating to soldered joints of articles mainly consisting of tungsten, soldered joints of articles consisting of the other said high melting point materials can be manufactured.

What is claimed is:

1. An electrode intended for a high-pressure gas discharge lamp which primarily consists of at least one of the metals selected from the group consisting of tungsten and tantalum and which is secured by means of a soldered joint to a current supply conductor mainly consisting of at least one of the metals selected from the group which consists of tungsten, molybdenum and tantalum, said metals having a melting point greater than 2000° C, said joint containing zirconium, and at least the external surface layer of the soldered joint consisting of zirconium nitride.

2. An electrode as claimed in claim 1, consisting of a mainly cylindrical body having a termination for the discharge which is formed in a rounded contour and in which the end face of the electrode remote from the termination is provided with a bore in which the current supply conductor is secured by means of zirconium solder which has the external surface layer of the solder converted into zirconium nitride.

3. An electrode as claimed in claim 1 carried in a short-arc xenon discharge lamp.

4. A high-pressure gas discharge lamp provided with an electrode as claimed in claim 1.

* * * * *